United States Patent [19]

Labib et al.

[11] Patent Number: 4,525,402
[45] Date of Patent: Jun. 25, 1985

[54] HIGH-DENSITY INFORMATION DISC LUBRICANTS

[75] Inventors: Mohamed E. Labib, Princeton Township, Mercer County; Eugene S. Poliniak, Willingboro, both of N.J.

[73] Assignee: RCA Corporation, Princeton, N.J.

[21] Appl. No.: 559,690

[22] Filed: Dec. 9, 1983

[51] Int. Cl.³ .......................... G11B 3/70; B32B 3/02
[52] U.S. Cl. ..................... 428/64; 252/49.6; 252/49.8; 369/276; 369/286; 369/288; 428/65; 428/447; 428/704; 428/702; 346/135.1
[58] Field of Search ............ 428/447, 64, 65, 702, 428/704; 252/49.6, 49.8; 346/135.1; 369/276, 286, 288

[56] References Cited

U.S. PATENT DOCUMENTS

| | | | |
|---|---|---|---|
| 4,275,101 | 6/1981 | Wang et al. | 369/286 |
| 4,330,583 | 5/1982 | Datta et al. | 428/65 |
| 4,340,629 | 7/1982 | Hillenbrand | 428/447 |
| 4,342,660 | 8/1982 | Berry | 428/447 |
| 4,346,468 | 8/1982 | Preston | 428/447 |
| 4,346,469 | 8/1982 | Hillenbrand | 428/447 |
| 4,351,048 | 9/1982 | Berry | 428/64 |
| 4,355,062 | 10/1982 | Wang et al. | 428/64 |
| 4,377,140 | 3/1983 | Preston | 428/447 |
| 4,383,961 | 5/1983 | Nyman et al. | 264/107 |
| 4,416,789 | 11/1983 | Shidlousky | 428/65 |
| 4,444,820 | 4/1984 | Datta | 428/64 |
| 4,448,848 | 5/1984 | Okita | 428/900 |
| 4,486,325 | 12/1984 | Polinak | 428/65 |

Primary Examiner—Ellis P. Robinson
Attorney, Agent, or Firm—Birgit E. Morris

[57] ABSTRACT

A titanium coupling agent of the formula

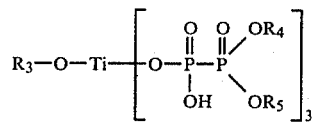

wherein $R_3$ is methyl, ethyl or isopropyl and $R_4$ and $R_5$ are long chain alkyl groups of 8–20 carbon atoms, when added to a fractionated methyl alkyl siloxane lubricant for capacitive electronic discs, improves the playback performance of the discs.

5 Claims, No Drawings

HIGH-DENSITY INFORMATION DISC LUBRICANTS

This invention relates to a lubricant additive for high-density information discs. More particularly, this invention relates to a lubricant additive for capacitance electronic discs that improves the playback performance of such discs, particularly their resistance to moisture.

BACKGROUND OF THE INVENTION

High-density information discs require a lubricant on their surface to reduce the sensitivity of the discs to atmospheric contaminants and to reduce wear on the playback stylus. The present commercial lubricant is a fractionated and purified methyl alkyl siloxane having the formula

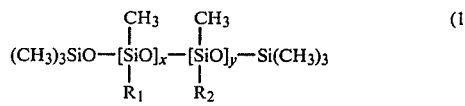
(1)

wherein $R_1$ and $R_2$ are alkyl groups of 4–20 carbon atoms, x is an integer of 2–4, y is an integer of 0–2 and wherein the sum of x and y is 4 or less, made according to the method described in U.S. Pat. No. 4,275,101 to Wang et al.

However, this lubricant system is sensitive to atmospheric conditions such as high temperature and high relative humidity and results in a phenomenon known as "carrier distress". Moisture dissolves certain impurities and salts on the disc's surface forming a solution. When the water evaporates, it leaves a salt deposit on the disc that causes the playback stylus to jump out of the information track, resulting in streaks or blackouts of the picture information observed by the viewer. If the deposits are exceptionally large, the stylus may skip over several grooves, leading to interruption of both sound and picture information. Depending on the length and frequency of the interruptions and skips, the record becomes commercially unacceptable.

Thus various dopants have been added to the lubricant to reduce carrier distress and skips. Generally effective dopants are polar compounds, but there is no way at present to predict whether a particular material or class of materials will be effective dopants. Known dopants include bis(hydroxyalkyl)disiloxanes, described in U.S. Pat. No. 4,355,062 to Wang et al, and hydroxylated amines such as are described in U.S. Pat. No. 4,330,583 to Datta et al. The former, while it has a pronounced positive effect on carrier distress, is a very expensive material. The latter has the disadvantage that it is not soluble in the methyl alkyl siloxane lubricant and thus must be applied separately or from a mixed solvent solution.

Several trimethoxy silanes have been tried as lubricants, but, while they do improve skip performance marginally, they are not effective to reduce carrier distress to a satisfactory level.

Thus the search for effective additives to methyl alkyl siloxane lubricants which will reduce carrier distress has continued.

SUMMARY OF THE INVENTION

We have discovered that titanium coupling agents can be added to methyl alkyl siloxane lubricants to impart improved resistance to moisture to high-density information discs, alone or in combination with other additives.

DETAILED DESCRIPTION OF THE INVENTION

The titanium coupling agents effective herein have the formula

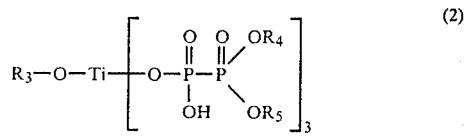
(2)

wherein $R_3$ is methyl, ethyl or isopropyl and $R_4$ and $R_5$ are long chain alkyl groups of 8–20 carbon atoms which can be the same or different. A sufficient amount of the additive can be added to improve carrier distress for lubricated discs, but an excessive amount, such as would reduce the lubricating effect and/or increase stylus wear of the disc, should be avoided. The titanate additive is soluble in the methyl alkyl siloxane lubricants and thus they can be applied to the surface of the disc together, either by direct application, such as by fogging or spraying, or by evaporating or spraying from a solution in a solvent such as n-heptane or n-heptane-isopropanol mixtures.

The additives should preferably be present in amounts of about 10 to 30 percent by weight of the methyl alkyl siloxane lubricants.

The invention will be further described in the following examples, but the invention is not to be limited to the details described therein. In the examples, parts and percentages are by weight.

Carrier distress time is measured by adding the amount of time in seconds (but discounting intervals of less than 10 microseconds) during record playback when the r.f. output of the player arm is less than 150 millivolts peak to peak and the time when the r.f. output gives above 8.6 or below 3.1 megahertz in frequency, indicating a defect. Such defects are noted by the viewer as dropouts. The present acceptable level of carrier distress for a video record is three seconds in one hour of playback time.

Another test of the disc is known as the small skips test. The r.f. output of the player arm normally detects eight consecutively numbered daxi codes for each rotation of the disc. Thus if less than eight daxi codes are noted per rotation, a computer attached to the player determines the number of daxi codes missed and then computes the number of grooves skipped. The number of times during one hour of playback that eight grooves or less are skipped (one small skip event) is monitored. The present acceptable level of small skip events is 30 per one hour of playback.

EXAMPLE 1

Compression molded capacitance electronic discs, as pressed from the mold, were lubricated with methyl decyl siloxane as in formula (1) which had been molecularly distilled at 100°–205° C. as a control; with a solution containing 85 percent of the siloxane and 15 percent of a titanium coupling agent having the formula

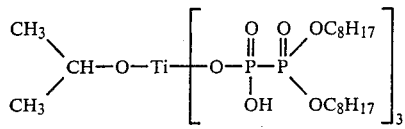

(3)

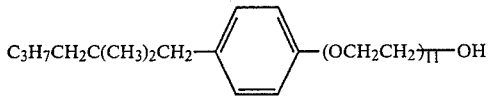

(5)

(Sample A) and with a solution containing 85 percent of the siloxane, 10 percent of the titanium coupling agent and 5 percent of (n-propyltrimethoxysilane), having the formula

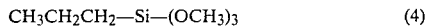

(4)

(Sample B). The lubricants were applied by spraying from a 0.3 percent solution in n-heptane.

The discs were played once, stressed by placing in a chamber held at 95 percent relative humidity and 100° F. for one hour and played again. The stress test was then repeated once.

Carrier distress and skips were measured for a series of twelve discs for each type. The results are given below in Table I.

followed with a deionized water rinse and dried with 1,1,2-trifluoro-2,2,1-trichloroethane according to U.S. Pat. No. 4,383,961. The results are given below in Table II.

TABLE II

| | CARRIER DISTRESS, Secs./Hour of Play | | | | | | | | |
|---|---|---|---|---|---|---|---|---|---|
| | Initial Play | | | After 1st Stress | | | After 2nd Stress | | |
| Sample | Median | Range | # Passed | Median | Range | # Passed | Median | Range | # Passed |
| Control | 3.5 | 1.8–13 | 3/12 | 6.9 | 1.8–14 | 5/12 | 3.0 | 1.5–10 | 4/12 |
| A | 1.3 | 0.5–2.6 | 12/12 | 1.3 | 0.5–77 | 6/12 | 0.8 | 0.5–53 | 11/12 |
| B | 1.6 | 0.9–4.2 | 9/12 | 1.3 | 0.6–5.1 | 11/12 | 1.0 | 0.6–4.1 | 11/12 |
| | Skips, # per Hour of Play | | | | | | | | |
| Control | 89 | 20–538 | 2/12 | 44 | 16–110 | 6/12 | 32 | 16–82 | 4/12 |
| A | 32 | 4–198 | 6/12 | 51 | 4–164 | 5/12 | 44 | 4–1424 | 4/12 |
| B | 73 | 16–528 | 4/12 | 52 | 14–80 | 7/12 | 41 | 3–92 | 4/12 |

It is apparent that the addition of titanate or titanate and silane additives gives improved results for carrier distress.

EXAMPLE 3

The addition of the titanate of the invention to capacitance electronic disc lubricants was compared to conventional silane-doped oil for two batches of records, one batch tested as-pressed from the mold and the other batch previously washed and dried as in Example 2. The results are shown below in Table III wherein Control A discs lubricated with siloxane containing 0.3 percent of bis(hydroxybutyl)disiloxane as pressed from

TABLE I

| | CARRIER DISTRESS, Secs./Hour of Play | | | | | | | | |
|---|---|---|---|---|---|---|---|---|---|
| | Initial Play | | | After 1st Stress | | | After 2nd Stress | | |
| Sample | Median | Range | # Passed | Median | Range | # Passed | Median | Range | # Passed |
| Control | 1.3 | 0.7–12 | 9/12 | 126 | 6.4–355 | 0/12 | 23 | 16–177 | 0/12 |
| A | 0.4 | 0.3–0.6 | 12/12 | 1.2 | 0.4–147 | 8/12 | 0.8 | 0.3–4.1 | 10/12 |
| B | 0.7 | 0.4–0.9 | 12/12 | 46 | 5.7–245 | 0/12 | 8.9 | 0.9–25 | 3/12 |
| | Skips, # per Hour of Play | | | | | | | | |
| Control | 24 | 2–428 | 6/12 | 35 | 2–54 | 4/12 | 14 | 2–24 | 12/12 |
| A | 18 | 2–40 | 9/12 | 24 | 0–3236 | 7/12 | 8 | 0–58 | 9/12 |
| B | 73 | 16–528 | 4/12 | 52 | 14–80 | 7/12 | 41 | 8–92 | 4/12 |

It is apparent that the addition of the titanate had a very beneficial effect on improving carrier distress.

EXAMPLE 2

The lubrication and testing as in Example 1 was repeated except that the discs employed were rinsed after pressing with a solution of the mold and Control B discs were similarly lubricated after cleaning and drying as in Example 2. Example 3A discs were lubricated with the methyl decyl siloxane containing 15 percent of the titanate of Example 1 as pressed, and Example 3B discs were first cleaned and dried.

TABLE III

| | CARRIER DISTRESS, Secs./Hour of Play | | | | | | | | |
|---|---|---|---|---|---|---|---|---|---|
| | Initial Play | | | After 1st Stress | | | After 2nd Stress | | |
| Sample | Median | Range | # Passed | Median | Range | # Passed | Median | Range | # Passed |
| Control A | 0.3 | 0.1–19 | 11/12 | 0.3 | 0.1–2.9 | 12/12 | 0.2 | 0.1–1.2 | 12/12 |
| Ex. 3A | 0.2 | 0.1–0.3 | 12/12 | 1.1 | 0.2–20 | 10/12 | 0.4 | 0.1–5.5 | 11/12 |
| Control B | 0.5 | 0.3–27 | 11/12 | 0.6 | 0.5–5 | 11/12 | 0.6 | 0.3–15 | 11/12 |
| Ex. 3B | 0.3 | 0.2–0.9 | 12/12 | 0.3 | 0.2–29 | 10/12 | 0.5 | 0.2–1.0 | 12/12 |
| | Skips, # per Hour of Play | | | | | | | | |
| Control A | 34 | 0–160 | 6/12 | 17 | 4–924 | 8/12 | 16 | 2–152 | 7/12 |
| Ex. 3A | 48 | 0–670 | 4/12 | 18 | 2–6230 | 9/12 | 8 | 4–2034 | 9/12 |
| Control B | 40 | 14–200 | 5/12 | 34 | 8–304 | 5/12 | 38 | 14–386 | 4/12 |

TABLE III-continued

| Ex. 3B | 26 | 6–130 | 7/12 | 16 | 0–17,392 | 8/12 | 17 | 0–1132 | 7/12 |

Thus the presently doped lubricant compares favorably to the commercially employed product.

We claim:

1. In a capacitive electronic disc having a methyl alkyl siloxane lubricant coating thereon, said lubricant being a fractionated and purified material having the formula

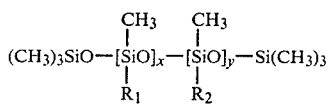

wherein $R_1$ and $R_2$ are alkyl groups of 4–20 carbon atoms, x is an integer of 2–4, y is an integer of 0–2 and wherein the sum of x and y is 4 or less, the improvement wherein said lubricant includes an effective amount of a titanate coupling agent of the formula

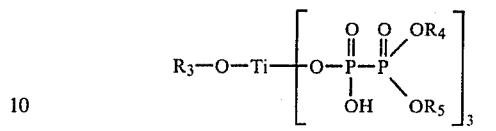

wherein $R_3$ is methyl, ethyl, or isopropyl and $R_4$ and $R_5$ are long chain alkyl groups of 8–20 carbon atoms which can be the same or different.

2. A disc according to claim 1 wherein the coupling agent is present in an amount of between about 10 and 30 percent by weight of the lubricant.

3. A disc according to claim 1 wherein a trimethyoxysilane additive is also present.

4. A disc according to claim 1 wherein the coupling agent has the formula

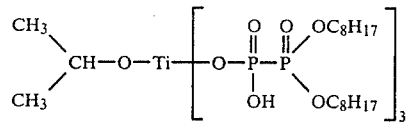

5. A disc according to claim 1 wherein $R_1$ and $R_2$ are decyl groups.

* * * * *